United States Patent
Cocks

(10) Patent No.: US 11,199,133 B2
(45) Date of Patent: Dec. 14, 2021

(54) AIRCRAFT SYSTEMS AND METHODS UTILIZING WASTE HEAT IN FUEL

(71) Applicant: Hamilton Sundstrand Corporation, Charlotte, NC (US)

(72) Inventor: Peter A T Cocks, South Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 200 days.

(21) Appl. No.: 16/222,599

(22) Filed: Dec. 17, 2018

(65) Prior Publication Data

US 2020/0191057 A1 Jun. 18, 2020

(51) Int. Cl.
*F01D 25/02* (2006.01)
*F02C 7/14* (2006.01)
*F02C 7/047* (2006.01)
*F02C 7/232* (2006.01)
*F02C 9/26* (2006.01)
*F02C 9/30* (2006.01)
(Continued)

(52) U.S. Cl.
CPC ............... *F02C 7/14* (2013.01); *B64D 15/02* (2013.01); *F01D 25/02* (2013.01); *F02C 7/047* (2013.01); *F02C 7/232* (2013.01); *F02C 9/263* (2013.01); *F02C 9/30* (2013.01); *F02C 7/222* (2013.01)

(58) Field of Classification Search
CPC .. F02C 7/047; F02C 7/14; F02C 7/222; F02C 7/232; F02C 9/263; F02C 9/30; B64D 15/00–04; B64D 15/06; B64D 13/06; B64D 37/34; B64D 2013/0607; F01D 25/02
See application file for complete search history.

(56) References Cited

U.S. PATENT DOCUMENTS 4,482,114 A * 11/1984 Gupta .................... B64D 15/02
244/118.5
4,705,100 A * 11/1987 Black ..................... F01D 25/18
123/553
(Continued)

FOREIGN PATENT DOCUMENTS

WO 9934106 A2 7/1999
WO 2014176622 A1 11/2014

OTHER PUBLICATIONS

Extended European search report issued in corresponding EP application No. 19215732.9, dated Apr. 23, 2020.

*Primary Examiner* — Gerald L Sung
*Assistant Examiner* — Rene D Ford
(74) *Attorney, Agent, or Firm* — Locke Lord LLP; Daniel J. Fiorello; Scott D. Wofsy

(57) ABSTRACT

An aircraft fuel system can include a fuel line configured to transport fuel therein, an exposed aircraft structure in direct or indirect thermal communication with the fuel in the fuel line to receive heat from the fuel to provide a deicing or anti-icing heat to the exposed aircraft structure. The exposed aircraft structure can include at least one internal fuel channel in fluid communication with the fuel line for direct thermal communication with the fuel. The system can include a fuel/fluid heat exchanger in fluid communication with the fuel line to transfer heat from the fuel to a fluid to provide indirect thermal communication between the fuel and the exposed aircraft structure.

18 Claims, 3 Drawing Sheets

(51) Int. Cl.
*B64D 15/02* (2006.01)
*F02C 7/22* (2006.01)

(56) References Cited

U.S. PATENT DOCUMENTS

| | | | |
|---|---|---|---|
| 5,121,598 A * | 6/1992 | Butler | F02C 7/14 |
| | | | 60/39.08 |
| 5,228,643 A * | 7/1993 | Manda | B64D 15/02 |
| | | | 244/134 B |
| 5,241,814 A | 9/1993 | Butler | |
| 5,257,498 A * | 11/1993 | Nikkanen | B64D 15/04 |
| | | | 244/134 B |
| 5,423,174 A * | 6/1995 | Mouton | F02C 7/047 |
| | | | 60/39.093 |
| 6,131,855 A * | 10/2000 | Porte | B64D 15/04 |
| | | | 244/134 B |
| 6,810,674 B2 | 11/2004 | Clements | |
| 8,844,293 B2 | 9/2014 | MacFarlane | |
| 2014/0345292 A1 | 11/2014 | Diaz et al. | |
| 2015/0291284 A1 * | 10/2015 | Victor | B64D 15/04 |
| | | | 244/134 B |
| 2016/0167801 A1 | 6/2016 | Haskins et al. | |
| 2016/0178204 A1 | 6/2016 | Wang et al. | |

* cited by examiner

AIRCRAFT SYSTEMS AND METHODS UTILIZING WASTE HEAT IN FUEL

BACKGROUND

1. Field

The present disclosure relates to fuel systems, e.g., for aircraft.

2. Description of Related Art

In aircraft turbomachine fuel systems, the fuel pump is traditionally mechanically coupled to the engine and thus pumps as a function of engine speed. Traditional fuel pumps are sized to provide flow for high power conditions (e.g., takeoff) or start/windmill, while during most conditions (e.g., cruise, descent) less fuel is needed by the combustor. Current systems recirculate the excess fuel (the difference between the fuel provided by the pump and what is required by the combustor), which add significant waste heat to the fuel. Thus, while the current state guarantees a reliable fuel flow to the engine, traditional systems greatly reduce the ability of the fuel for use as a heat sink for providing cooling to other systems.

Such conventional methods and systems have generally been considered satisfactory for their intended purpose. However, there is still a need in the art for improved fuel systems and methods. The present disclosure provides a solution for this need.

SUMMARY

In accordance with at least one aspect of this disclosure, an aircraft fuel system can include a fuel line configured to transport fuel therein, an exposed aircraft structure in direct or indirect thermal communication with the fuel in the fuel line to receive heat from the fuel to provide a deicing or anti-icing heat to the exposed aircraft structure. The exposed aircraft structure can include at least one internal fuel channel in fluid communication with the fuel line for direct thermal communication with the fluid. The system can include a fuel/fluid heat exchanger in fluid communication with the fuel line to transfer heat from the fuel to a fluid to provide indirect thermal communication between the fuel and the exposed aircraft structure.

In certain embodiments that include the fuel/fluid heat exchanger, the fluid can be in direct thermal communication with the exposed aircraft structure. For example, the exposed aircraft structure can include at least one internal fluid channel in fluid communication with the fuel/air heat exchanger for receiving the fluid from the fuel/fluid heat exchanger. The fluid can be air, for example, or any other suitable fluid (e.g., a coolant).

In certain embodiments, the at least one internal fluid channel can be in fluid communication with an exhaust to exhaust air after passing through the exposed aircraft structure. The at least one internal fluid channel can include a heat exchanger loop such that fluid loops back to the heat exchanger after passing through the exposed aircraft structure which cools the fluid for accepting more heat from the heat exchanger.

The at least one internal fuel channel can be in fluid communication with a fuel tank of the aircraft. The fuel/fluid heat exchanger can be in fluid communication with the fuel tank of the aircraft (e.g., such that cooled fuel that passed through the heat exchanger can flow to the fuel tank).

In certain embodiments, the system can include a valve (e.g., a shutoff valve) disposed in the fuel line thermally up stream of the exposed aircraft structure and configured to selectively shutoff and/or meter fuel that is in thermal communication with the exposed aircraft structure. Any suitable type of valve and/or controller therefor is contemplated herein.

The system can include a fuel pump in fluid communication with the fuel line upstream of the valve between the fuel tank and the valve. The fuel pump can be configured to pump fuel to an engine through a main flow line. The system can include a pump loop for looping fuel from a pump outlet to a pump inlet, the pump loop disposed between the valve and main flow line.

In accordance with at least one aspect of this disclosure, a method for heating an exposed aircraft structure and/or cooling fuel can include thermally communicating hot fuel in a fuel line with the exposed aircraft structure to heat the exposed aircraft structure to deice or prevent ice formation on the exposed aircraft structure. In certain embodiments, the exposed aircraft structure can be a deicing structure, and thermally communicating can include flowing fuel into internal fuel channels of the aircraft structure thereby directly thermally communicating the fuel with the exposed aircraft structure. In certain embodiments, the exposed aircraft structure is a deicing aircraft structure, and thermally communicating can include flowing fuel to a fuel/fluid heat exchanger to transfer heat from the fuel to a fluid, wherein thermally communicating includes flowing the fluid to the exposed aircraft structure to indirectly thermally communicate the fuel to the exposed aircraft structure.

The method can include flowing fuel to a fuel tank after thermally communicating the fuel with the exposed aircraft structure. The method can include controlling a valve to allow, prevent, or meter fuel in thermal communication with the exposed aircraft structure. Controlling the valve can include opening the valve to allow fuel to be in thermal communication with the exposed aircraft structure at a cruise or descent power setting. Controlling the valve can include opening the valve to allow flow at a threshold fuel temperature. Any other methods and/or portions thereof are contemplated herein.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
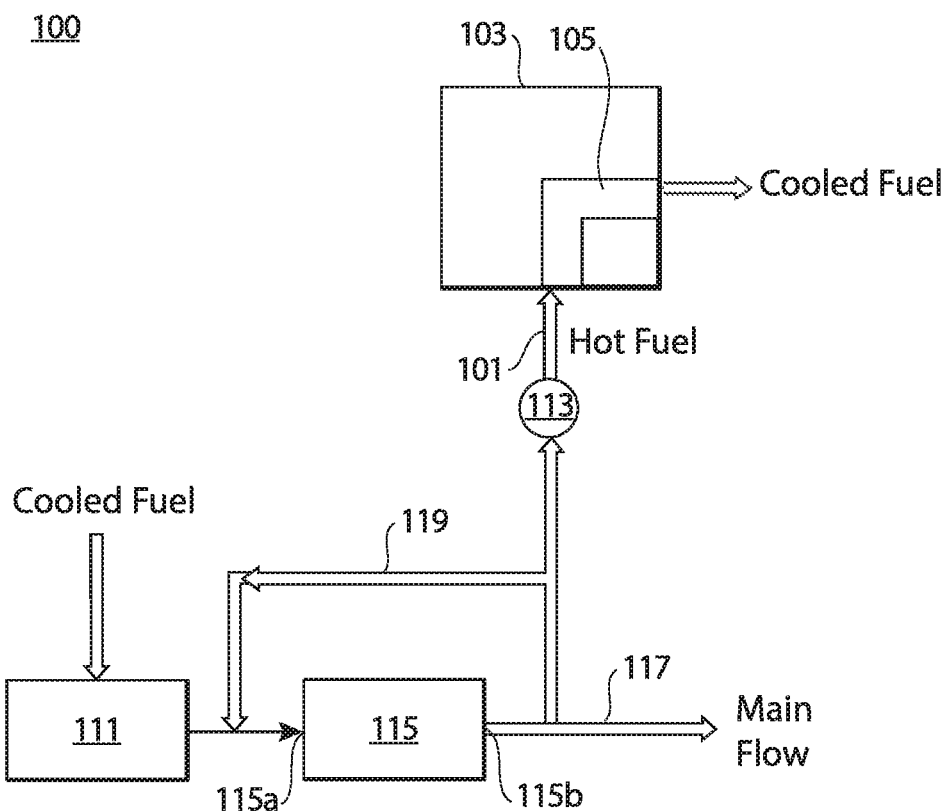
FIG. 1 is a schematic diagram of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3.

Figure 2:
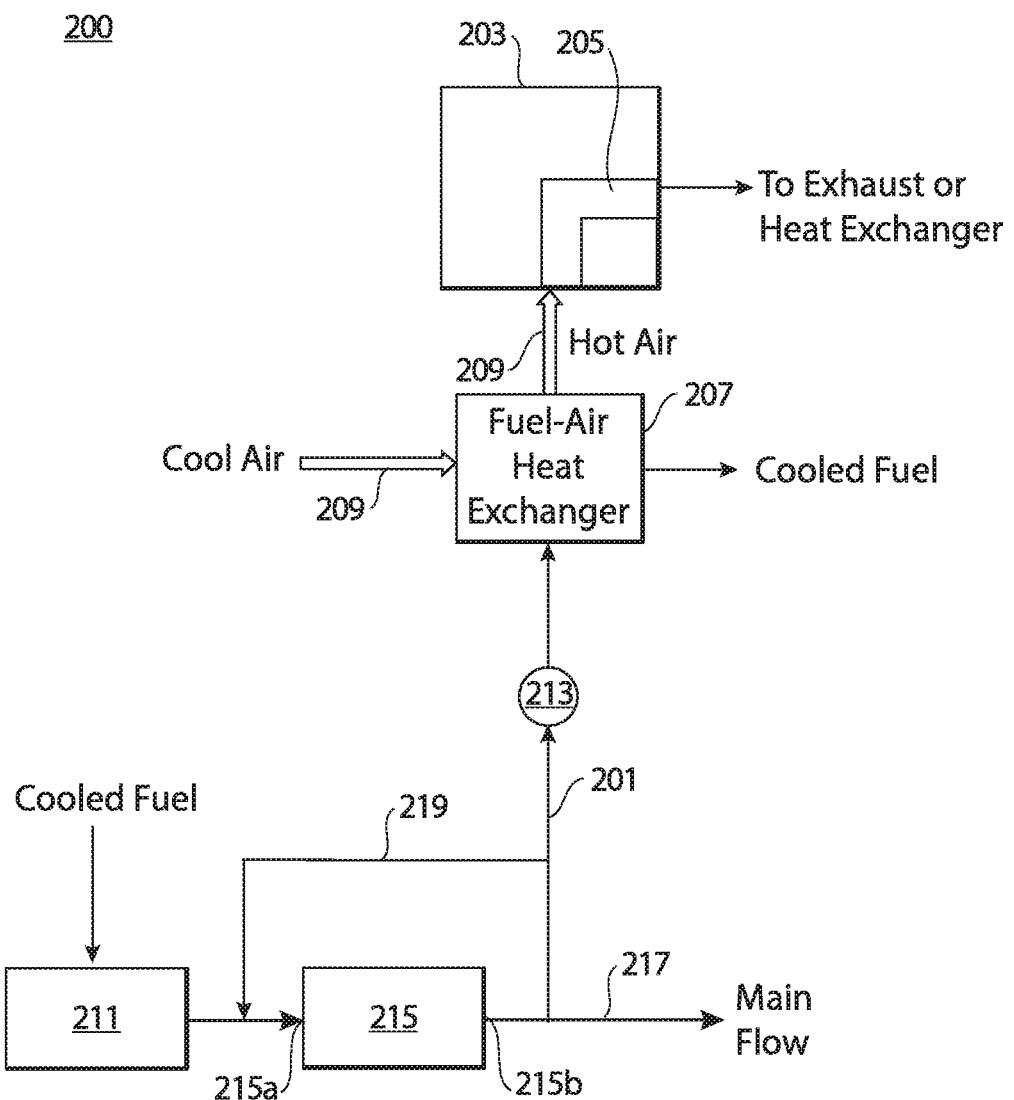
FIG. 2 is a schematic diagram of an embodiment of a system in accordance with this disclosure.
Figure 3:
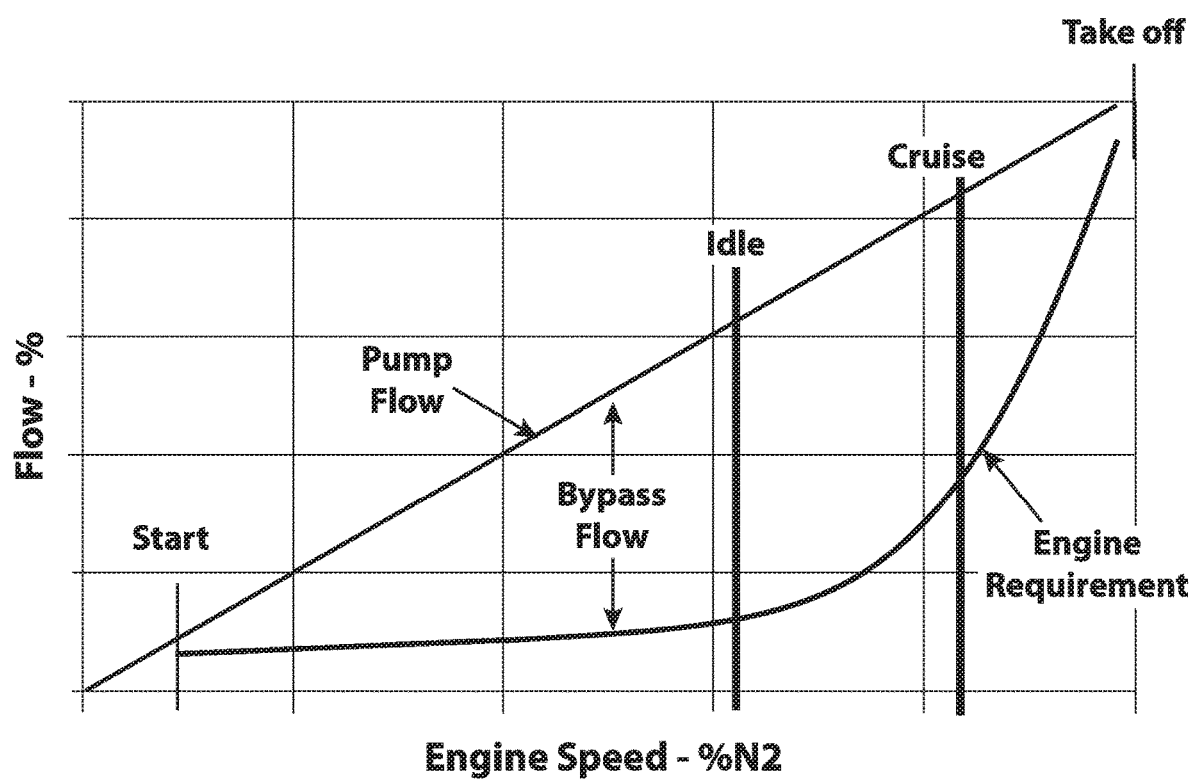
FIG. 3 is a chart of pump flow and engine flow requirements as a function of engine speed of an embodiment of a system in accordance with this disclosure, showing a region of bypass flow between a start condition and a take-off condition.

In accordance with at least one aspect of this disclosure, referring to FIGS. 1 and 2, an aircraft fuel system 100, 200 can include a fuel line 101, 201 configured to transport fuel therein. The system 100, 200 can include an exposed aircraft structure 103, 203 in direct or indirect thermal communication with the fuel in the fuel line 101, 201 to receive heat from the fuel to provide a deicing or anti-icing heat to the exposed aircraft structure 103, 203. The exposed aircraft structure 103, 203 can be an airframe component (e.g., a leading edge of a wing, a nacelle, an entire wing surface, a control surface), an instrument (e.g., a probe or sensor), a deicing structure that attaches to an airframe component or instrument (e.g., an existing deicing structure that includes one or more interior channels), or any other suitable structure that can experience icing or benefits from heating, for example.

In certain embodiments, as shown in FIG. 1, the exposed aircraft structure 101 can include at least one internal fuel channel 105 in fluid communication with the fuel line 101 for direct thermal communication with the fuel. For example, the internal fuel channel 105 can form part of the fuel circuit or include a fuel line 101 disposed therein.

As shown in FIG. 2, the system 200 can include at least one fuel/fluid heat exchanger 207 in fluid communication with the fuel line 201 to transfer heat from the fuel in the fuel line 201 to a fluid 209 to provide indirect thermal communication between the fuel in the fuel line 201 and the exposed aircraft structure 203. In certain embodiments that include a fuel/fluid heat exchanger 207, the fluid 209 can be in direct thermal communication with the exposed aircraft structure 203. For example, the exposed aircraft structure 203 can include at least one internal fluid channel 205 in fluid communication with the fuel/air heat exchanger 207 for receiving the fluid 209 from the fuel/fluid heat exchanger 207.

The fluid 209 can be air (e.g., as shown), for example, or any other suitable fluid (e.g., liquid or gas coolant). The air can be compressor bleed air, cold ram air, or cabin air, for example, or can come from any other suitable source.

In certain embodiments, the at least one internal fluid channel 205 can be in fluid communication with an exhaust to exhaust air after passing through the exposed aircraft structure 203. In certain embodiments, the at least one internal fluid channel 205 can be in fluid communication with a heat exchanger loop such that fluid loops back to the heat exchanger 207 after passing through the exposed aircraft structure 203 which cools the fluid for accepting more heat from the heat exchanger 207 (e.g., which can provide a closed loop circuit for a coolant).

As shown in FIG. 1, the at least one internal fuel channel 105 can be in fluid communication with a fuel tank 111 of the aircraft to return the fuel. Similarly, as shown in FIG. 2, the fuel/fluid heat exchanger 207 can be in fluid communication with the fuel tank 211 of the aircraft (e.g., such that cooled fuel that passed through the heat exchanger 207 can flow to the fuel tank 211). It is contemplated that the fuel or fluid leaving structure 103, 203 can be at least partially routed to any other suitable location.

In certain embodiments, the system 100, 200 can include a valve 113, 213 (e.g., a shutoff valve) disposed in the fuel line thermally up stream of the exposed aircraft structure 103, 203 and configured to selectively shutoff and/or meter fuel that is in thermal communication with the exposed aircraft structure 103, 203. Any suitable type of valve and/or controller (e.g., having any suitable hardware and/or software module(s)) therefor is contemplated herein.

The system 100, 200 can include a fuel pump 115, 215 in fluid communication with the fuel line 101, 201, e.g., upstream of the valve 113, 213 between the fuel tank 111, 211 and the valve 113, 213. The fuel pump 215 can be configured to pump fuel to an engine (not shown) through a main flow line 117, 217.

As shown in FIGS. 1 and 2, the system 100, 200 can include a pump loop 119, 219 for looping fuel from a pump outlet 115b, 215b to a pump inlet 115a, 215a. The pump loop 119 can be disposed between the valve 113, 213 and main flow line 117. The pump loop 219 can cause addition of waste heat to the fuel when less fuel is needed by the engine and more fuel is cycled in the pump loop 219. It is contemplated that any suitable valve (e.g., a shut off or metering valve) can be utilized, in addition to or instead of valve 113, 213, to control flow in the pump loop 219 and/or to distribute a proportion of flow in the pump loop 219 and/or in thermal communication with the exposed aircraft structure 103, 203.

Certain embodiments may not include a separate pump loop 119, 219 and may instead cause looping through the thermal transfer path with the exposed aircraft structure. For example, in certain embodiments, the cooled fuel exiting structure 103 or heat exchanger 207 can be cycled directly back to the pump inlet 215a instead of a tank 111, 211, or at least partially to the tank 111, 211, creating a pump loop.

In accordance with at least one aspect of this disclosure, a method for heating an exposed aircraft structure (e.g., 103, 203) and/or cooling fuel can include thermally communicating hot fuel in a fuel line (e.g., 101, 201) with the exposed aircraft structure to heat the exposed aircraft structure to deice or prevent ice formation on the exposed aircraft structure. In certain embodiments, the exposed aircraft structure can be a deicing structure, and thermally communicating can include flowing fuel into internal fuel channels of the aircraft structure thereby directly thermally communicating the fuel with the exposed aircraft structure. In certain embodiments, the exposed aircraft structure is a deicing aircraft structure, and thermally communicating can include flowing fuel to a fuel/fluid heat exchanger to transfer heat from the fuel to a fluid, wherein thermally communicating includes flowing the fluid to the exposed aircraft structure to indirectly thermally communicate the fuel to the exposed aircraft structure.

The method can include flowing fuel to a fuel tank after thermally communicating the fuel with the exposed aircraft structure. The method can include controlling a valve (e.g., 113, 213) to allow, prevent, or meter fuel in thermal communication with the exposed aircraft structure. Controlling the valve can include opening the valve to allow fuel to be in thermal communication with the exposed aircraft structure at a cruise or descent power setting. Controlling the valve can include opening the valve to allow flow at a threshold fuel temperature (e.g., sensed by one or more temperature sensors operatively connected to a fuel line 101, 201, loop 119, 219, tank 111, 211, and/or otherwise inferred). Any other methods and/or portions thereof are contemplated herein.

Any suitable method and/or portion(s) thereof can be computer implemented (e.g., on a controller operatively connected to a valve, not shown) using any suitable hardware and/or software module(s). In certain embodiments, a valve can be controlled manually in any suitable manner by a pilot (e.g., via a deice switch in the cockpit) to allow flow to the exposed aircraft structure to prevent icing or to cause deicing. In certain embodiments, fuel can always be in direct or indirect thermal communication with the exposed aircraft structure to constantly heat the exposed aircraft structure and/or constantly cool the fuel.

FIG. 3 shows a chart of pump flow and engine flow requirements as a function of engine speed of an embodiment of a system in accordance with this disclosure. FIG. 3 shows a region of bypass flow where waste heat is added to fuel between a start condition and a take-off condition because flow must be recycled, e.g., through loop 119, 219. Certain embodiments of a system can be configured to transfer waste heat from fuel to be used for deicing during any suitable flight phase (e.g., as a function of excess fuel flow in accordance with the chart of FIG. 3).

In accordance with this disclosure, in certain embodiments, once excess main pump flow is available, a valve can open to send excess main pump flow for direct deicing use or to a heat exchanger for indirect deicing use. The cooled fuel can then return to the tank or other suitable location. Embodiments can flow fuel through tubes at, e.g., a leading edge, nacelle, or other icing area.

Fuel exiting the main fuel pump can be hot and fuel temperatures are projected to increase in the future. Embodiments use the excess main pump flow to do something useful (e.g., anti-icing and/or deicing) that may need to be done anyway and also reduce the waste heat added to the fuel by the recirculation loop (bypass flow) typical in certain fuel systems. In addition to the benefit of heating a structure (e.g., for deicing or any other suitable use), the reduction in waste heat enables the fuel to be utilized for cooling of other aircraft or engine heat loads, which improves the overall aircraft thermal management system efficiency, size, and weight. Embodiments also provide a higher quality heat source for deicing applications than existing systems (e.g., having electrical heaters).

As will be appreciated by those skilled in the art, aspects of the present disclosure may be embodied as a system, method, or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An aircraft fuel system, comprising:
   a main fuel line configured to transport fuel to an engine;
   a fuel pump disposed on the main fuel line;
   a pump return fuel line connected to the main fuel line to take a portion of the fuel from the main fuel line at a position downstream of the fuel pump and to return the portion of the fuel to the main fuel line at a position upstream of the fuel pump;
   an exposed aircraft structure in direct or indirect thermal communication with the fuel to receive heat from the fuel to provide a deicing or anti-icing heat to the exposed aircraft structure; and
   a thermal fuel line that either:
   runs from the pump return fuel line to the exposed aircraft structure in the case of direct thermal communication, or
   runs from the pump return fuel line to a fuel/fluid heat exchanger which is in thermal communication with the exposed aircraft structure in the case indirect thermal communication.

2. The system of claim 1, further comprising a valve disposed in the thermal fuel line thermally upstream of the exposed aircraft structure and configured to selectively shutoff and/or meter the fuel that is in thermal communication with the exposed aircraft structure.

3. The system of claim 1, wherein, in the case of direct thermal communication, the exposed aircraft structure includes at least one internal fuel channel in fluid communication with the thermal fuel line for direct thermal communication with the fuel.

4. The system of claim 3, wherein the at least one internal fuel channel is in fluid communication with a fuel tank of the aircraft.

5. The system of claim 1, wherein in the case of indirect thermal communication, further comprising the fuel/fluid heat exchanger in fluid communication with the thermal fuel line to transfer heat from the fuel to a fluid to provide indirect thermal communication between the fuel and the exposed aircraft structure.

6. The system of claim 5, wherein the fluid is air.

7. The system of claim 5, wherein the fuel/fluid heat exchanger is in fluid communication with a fuel tank of the aircraft.

8. The system of claim 5, wherein the fluid is in direct thermal communication with the exposed aircraft structure.

9. The system of claim 8, wherein the exposed aircraft structure includes at least one internal fluid channel in fluid communication with the fuel/fluid heat exchanger for receiving the fluid from the fuel/fluid heat exchanger.

10. The system of claim 9, wherein the at least one internal fluid channel is in fluid communication with an exhaust to exhaust air after passing through the exposed aircraft structure.

11. The system of claim 9, wherein the at least one internal fluid channel includes a heat exchanger loop such that fluid loops back to the heat exchanger after passing through the exposed aircraft structure which cools the fluid for accepting more heat from the heat exchanger.

12. A method for heating an exposed aircraft structure and/or cooling fuel using an aircraft fuel system, comprising:
    a main fuel line configured to transport fuel to an engine;
    a fuel pump disposed on the main fuel line;
    a pump return fuel line connected to the main fuel line to take a portion of the fuel from the main fuel line at a position downstream of the fuel pump and to return the portion of the fuel to the main fuel line at a position upstream of the fuel pump;
    an exposed aircraft structure in direct or indirect thermal communication with the fuel to receive heat from the fuel to provide a deicing or anti-icing heat to the exposed aircraft structure; and
    a thermal fuel line that either:
    runs from the pump return fuel line to the exposed aircraft structure in the case of direct thermal communication, or
    runs from the pump return fuel line to a fuel/fluid heat exchanger which is in thermal communication with the exposed aircraft structure in the case indirect thermal communication,
    wherein the method comprises: thermally communicating a hot fuel in the thermal fuel line with the exposed aircraft structure to heat the exposed aircraft structure to deice or prevent ice formation on the exposed aircraft structure.

13. The method of claim 12, wherein, in the case of direct thermal communication, the exposed aircraft structure is a deicing structure, wherein thermally communicating includes flowing the hot fuel into at least one internal fuel channel of the aircraft structure thereby directly thermally communicating the hot fuel with the exposed aircraft structure.

14. The method of claim 12, wherein, in the case of indirect thermal communication, the exposed aircraft structure is a deicing aircraft structure, wherein thermally communicating includes flowing the hot fuel to the fuel/fluid heat exchanger to transfer heat from the hot fuel to a fluid, wherein thermally communicating includes flowing the fluid to the exposed aircraft structure to indirectly thermally communicate the hot fuel to the exposed aircraft structure.

15. The method of claim 12, further comprising flowing the hot fuel to a fuel tank after thermally communicating the hot fuel with the exposed aircraft structure.

16. The method of claim 12, further comprising controlling a valve to allow, prevent, or meter the hot fuel in thermal communication with the exposed aircraft structure.

17. The method of claim 16, wherein controlling the valve includes opening the valve to allow the hot fuel to be in thermal communication with the exposed aircraft structure at a cruise or descent power setting.

18. The method of claim 17, wherein controlling the valve can include opening the valve to allow a flow of the hot fuel at a threshold fuel temperature.

\* \* \* \* \*